United States Patent
Makkiya et al.

(10) Patent No.: US 11,035,303 B2
(45) Date of Patent: Jun. 15, 2021

(54) METHOD AND SYSTEM FOR ENGINE START/STOP CONTROL

(71) Applicant: Ford Global Technologies, LLC, Dearborn, MI (US)

(72) Inventors: Hussam Makkiya, Dearborn, MI (US); Marirose Ilkka, Royal Oak, MI (US); Ahmed Awadi, Farmington Hills, MI (US); Laurie Elizabeth Transou, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/427,187

(22) Filed: May 30, 2019

(65) Prior Publication Data

US 2020/0378319 A1 Dec. 3, 2020

(51) Int. Cl.
*F02D 29/00* (2006.01)
*F02D 29/02* (2006.01)

(52) U.S. Cl.
CPC .......... *F02D 29/02* (2013.01); *F02D 2200/50* (2013.01); *F02D 2200/606* (2013.01)

(58) Field of Classification Search
CPC .......... F02N 11/084; F02N 2300/2006; F02D 41/042; F02D 41/065; F02D 41/008; F02D 41/083; F02D 41/0855
See application file for complete search history.

(56) References Cited

U.S. PATENT DOCUMENTS

| | | | |
|---|---|---|---|
| 9,045,132 B1* | 6/2015 | Zhao | F02N 11/0837 |
| 10,072,625 B2 | 9/2018 | Hesketh et al. | |
| 2009/0150025 A1* | 6/2009 | Akahoshi | F02D 41/042 |
| | | | 701/36 |
| 2011/0005486 A1* | 1/2011 | Nakamura | F02N 11/0837 |
| | | | 123/179.4 |
| 2012/0089317 A1* | 4/2012 | Herbolzheimer | B60H 1/322 |
| | | | 701/102 |
| 2012/0191330 A1* | 7/2012 | Nitz | F02N 11/084 |
| | | | 701/113 |
| 2015/0175149 A1* | 6/2015 | Zhao | F02N 11/084 |
| | | | 701/22 |
| 2016/0305388 A1 | 10/2016 | Miller et al. | |
| 2017/0197622 A1* | 7/2017 | Books | B60R 16/0236 |
| 2018/0274510 A1 | 9/2018 | Pedlar et al. | |
| 2018/0328330 A1* | 11/2018 | Terahata | F02N 11/0837 |

FOREIGN PATENT DOCUMENTS

FR 2937091 A1 4/2010

* cited by examiner

*Primary Examiner* — Phutthiwat Wongwian
*Assistant Examiner* — Sherman D Manley
(74) *Attorney, Agent, or Firm* — Geoffrey Brumbaugh; McCoy Russell LLP

(57) ABSTRACT

Methods and systems are provided for optimizing engine climate control performance and fuel economy in engines configured with start/stop capabilities. Climate control inhibits of start/stop actions are adjusted as a function of operator driving habits and climate control inputs and preferences. The approach enables climate performance to be improved while also allowing for frequent idle-stop operation.

19 Claims, 7 Drawing Sheets

| S/S Parameter Thr. | Aggressive driver | Passive driver |
|---|---|---|
| Acc. PP threshold | Increase | Decrease |
| Brake PP threshold | Increase | Decrease |

FIG. 5

| S/S Parameter Thr. | Aggressive climate control | Passive climate control |
|---|---|---|
| Evap Temp Thr | Increase | Decrease |
| Battery SOC Thr | Increase | Decrease |
| Cabin Temp Thr | Increase | Decrease |
| Ambient Temp Thr | Adjust to provide narrower range | Adjust to provide wider range |
| Blower ramp-down rate | Decrease | Increase |

FIG. 6

| ECT threshold | Aggressive climate control | Passive climate control |
|---|---|---|
| Aggressive driver | Decrease | Increase |
| Passive driver | Increase | Decrease |

FIG. 7

METHOD AND SYSTEM FOR ENGINE START/STOP CONTROL

FIELD

The present description relates generally to methods and systems for controlling a vehicle engine configured with start/stop capabilities to extend a duration of engine idle stop.

BACKGROUND/SUMMARY

Vehicle engines may be configured with start/stop capabilities that enable the engine to be shut down during selected idle-stop conditions. For example, the engine may be selectively shut down when the vehicle speed is decreasing, when an accelerator pedal is released, when the vehicle comes to a stop while a brake is applied (such as at a traffic signal), etc. The engine is then restarted once restart conditions are met, such as when the brake is released, when an accelerator pedal is applied, when an air-conditioning compressor is operated, etc. Such stop/start systems enable fuel savings, reduction in exhaust emissions, reduction in noise, and the like.

The performance of vehicle climate control systems, however, may be impacted during start/stop operations. For example, air conditioning (AC) systems may include AC compressors that are not electrically powered. Instead, they may be powered by an engine front end accessory drive (FEAD), and may be connected to the FEAD through a system of belts and pulleys. Consequently, when the engine is shutdown, the compressor does not work. When operated, the AC compressor pressurizes refrigerant flowing therethrough based on cabin climate control demands of a vehicle customer (such as a desired cabin temperature set by the vehicle customer). When the engine is shutdown, there may be a rise in refrigerant temperature and a resulting increase in AC evaporator temperature. In addition to causing passenger discomfort due to a rise in the cabin temperature and humidity, the increased evaporator temperature can also cause an unpleasant musty odor to transfer to the passenger cabin and degrade cabin air quality.

To address these issues, engine controllers may apply climate control inhibits to start/stop operations to ensure that climate control and passenger comfort is maintained. The climate control inhibits may inhibit an engine from being turned off at idle-stop conditions, or may restart the engine from idle-stop earlier, thereby causing a reduction in frequency and duration of engine shutdowns. For example, as shown by Hesketh et al. in U.S. Pat. No. 10,072,625, when an operator selects a comfort mode, a larger number of climate inhibits are applied, trading out fuel efficiency for passenger comfort. In comparison, when the operator selects fuel economy, fewer climate inhibits are applied. Example climate inhibits may include an evaporator temperature limit which causes the engine to continue running so as to not to let the evaporator temperature exceed a threshold when the compressor is not working. As another example, a cabin temperature inhibit may cause the engine to continue running so as to not to let the cabin temperature exceed an operator selected temperature setting.

The inventors herein have recognized potential issues with such an approach. For example, in any given selectable mode, the approach of Hesketh applies the same climate control inhibits for every driver and every driving situation. However, the inventors herein have recognized that based on the driving habits of each individual driver as well as their climate control preferences, a more optimum balance between climate control performance and fuel economy can be achieved. In the approach of Hesketh, the engine may be restarted from shutdown to warm an engine to a threshold temperature irrespective of whether the vehicle operator drives aggressively or not, as well as irrespective of whether the vehicle operator has a preference for higher or lower cabin temperatures or blower settings (on average). However, there may be synergistic interactions that could be leveraged to extend the duration of the engine shutdown and preempt an early restart to warm the engine. For example, if it is known that the vehicle operator drives aggressively (e.g., lead footed driver), then a rapid engine temperature ramp-up can be anticipated when the engine is restarted. Consequently, the lower than expected time needed to warm up the engine can be leveraged to lower an engine coolant temperature (ECT) threshold for start/stop operations. Therein, the engine may be restarted only if the engine temperature drops below a lower than default ECT threshold, allowing for the engine to remain shut down for a longer time. As another example, at least a portion of the heat stored in the engine coolant can be used for cabin heating. On the other hand, if it is known that the vehicle operator tends to like a cooler cabin temperature, then it can be predicted that less of the engine coolant heat is required to heat the cabin. Consequently, the ECT threshold for start/stop operations can be lowered, allowing for the engine to remain shut down for a longer time.

In one example, the above issues may be at least partially addressed by a method for an engine, comprising: adaptively adjusting a threshold for a parameter associated with idle-stop operation of an engine as a function of at least one of an operator drive history and operator cabin climate control preferences, the operator drive history and operator cabin climate control preferences learned over a plurality of drive cycles including a current drive cycle; and inhibiting the idle-stop operation responsive to a value of the parameter relative to the adjusted threshold. In this way, climate control performance may be balanced more effectively with fuel economy in an engine with start/stop capabilities.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a table of example adjustments to start/stop parameter thresholds as a function of driving inputs.

FIG. 6 shows a table of example adjustments to start/stop parameter thresholds as a function of climate control inputs.

FIG. 7 shows a table of example adjustments to start/stop parameter thresholds as a function of each of driving and climate control inputs.

DETAILED DESCRIPTION

Figure 8:
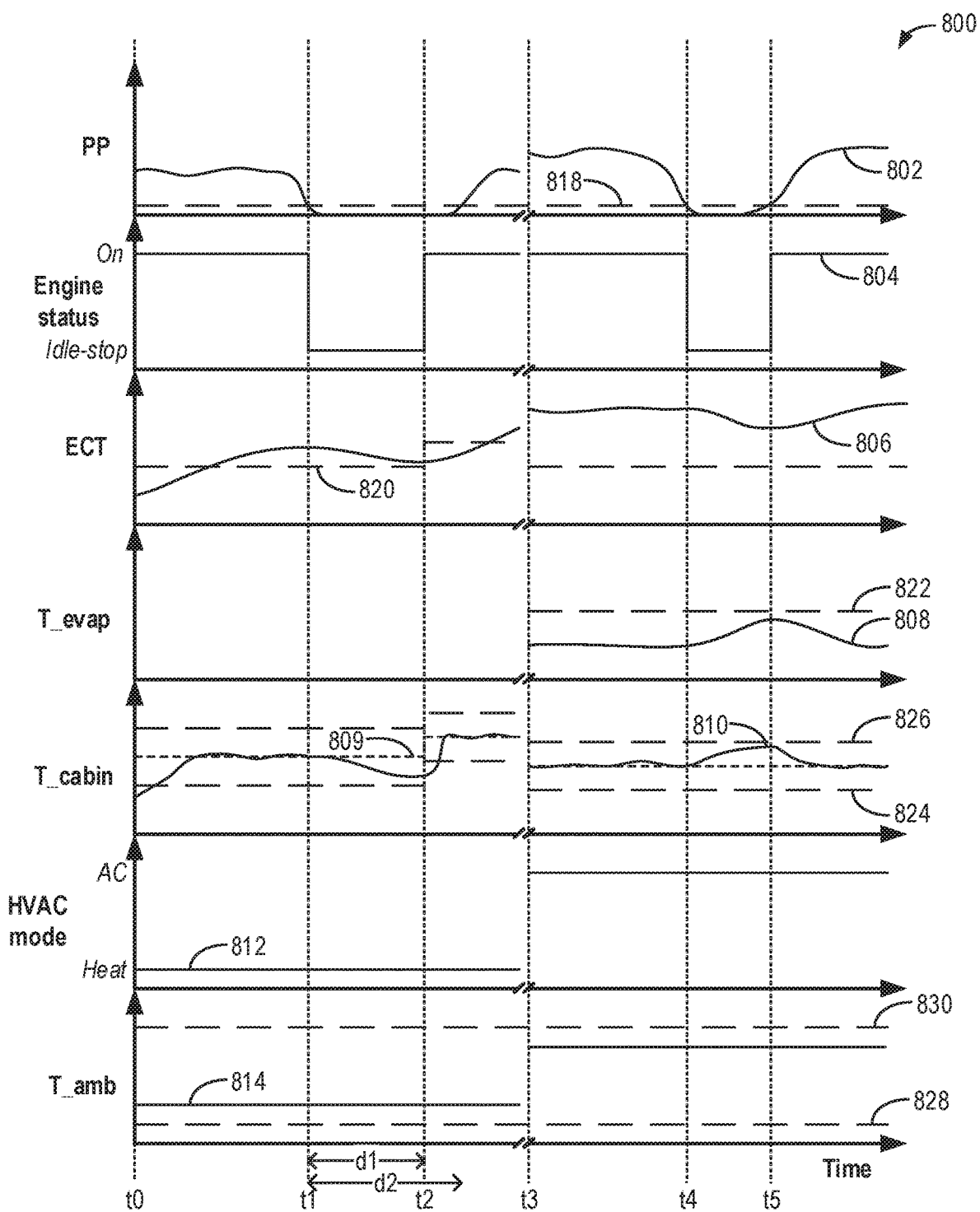
FIG. 8 shows a prophetic example of engine start/stop operations with climate control inhibits adjusted for a first driver as a function of a first drive history and first climate control preferences.
Figure 9:
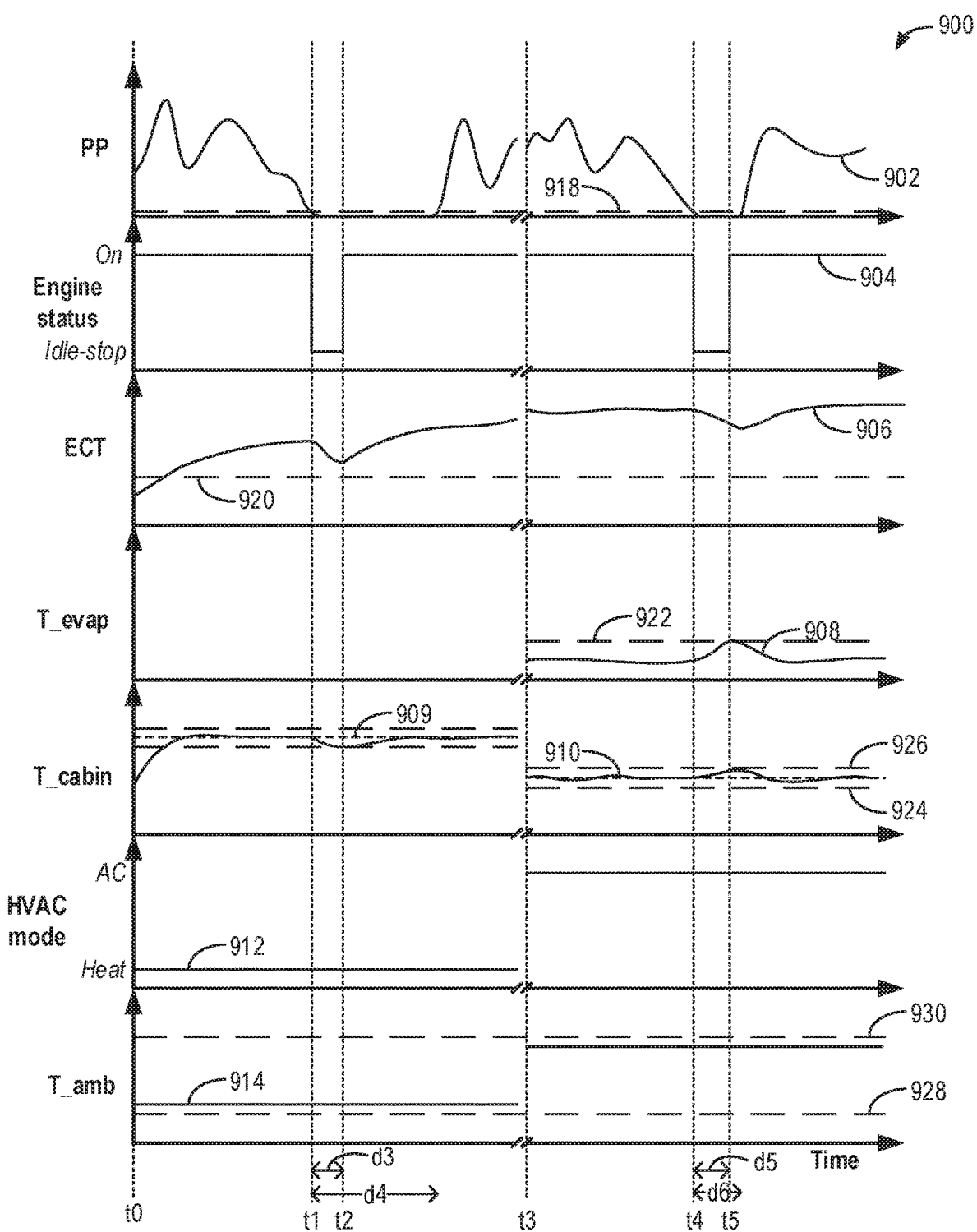
FIG. 9 shows a prophetic example of engine start/stop operations with climate control inhibits adjusted for a second driver as a function of a second drive history and second climate control preferences, different from the preferences of the first driver of FIG. 8.

The following description relates to systems and methods for extending a duration of engine idle-stop control in a vehicle system configured with start/stop capabilities. An example engine system is shown in FIG. 2, which may be coupled in a hybrid vehicle, such as the vehicle system of FIG. 1. An engine controller may perform a control routine, such as the example routine of FIG. 3, to adaptively adjust thresholds for one or more start/stop parameters as a function of driver behavior on a current drive cycle as well as from a drive history. The driver behavior may be learned based on driving inputs as well as climate control inputs and stored as a function of driver identity. Start/stop parameter thresholds are then adjusted, as elaborated at FIGS. 4-7, so as to better balance fuel economy and climate control performance. For example, climate control inhibits of engine shutdown are varied to improve climate control performance or fuel economy based on the driver behavior. Example vehicle operations with adjusted start/stop thresholds are shown at FIGS. 8-9.

Figure 1:
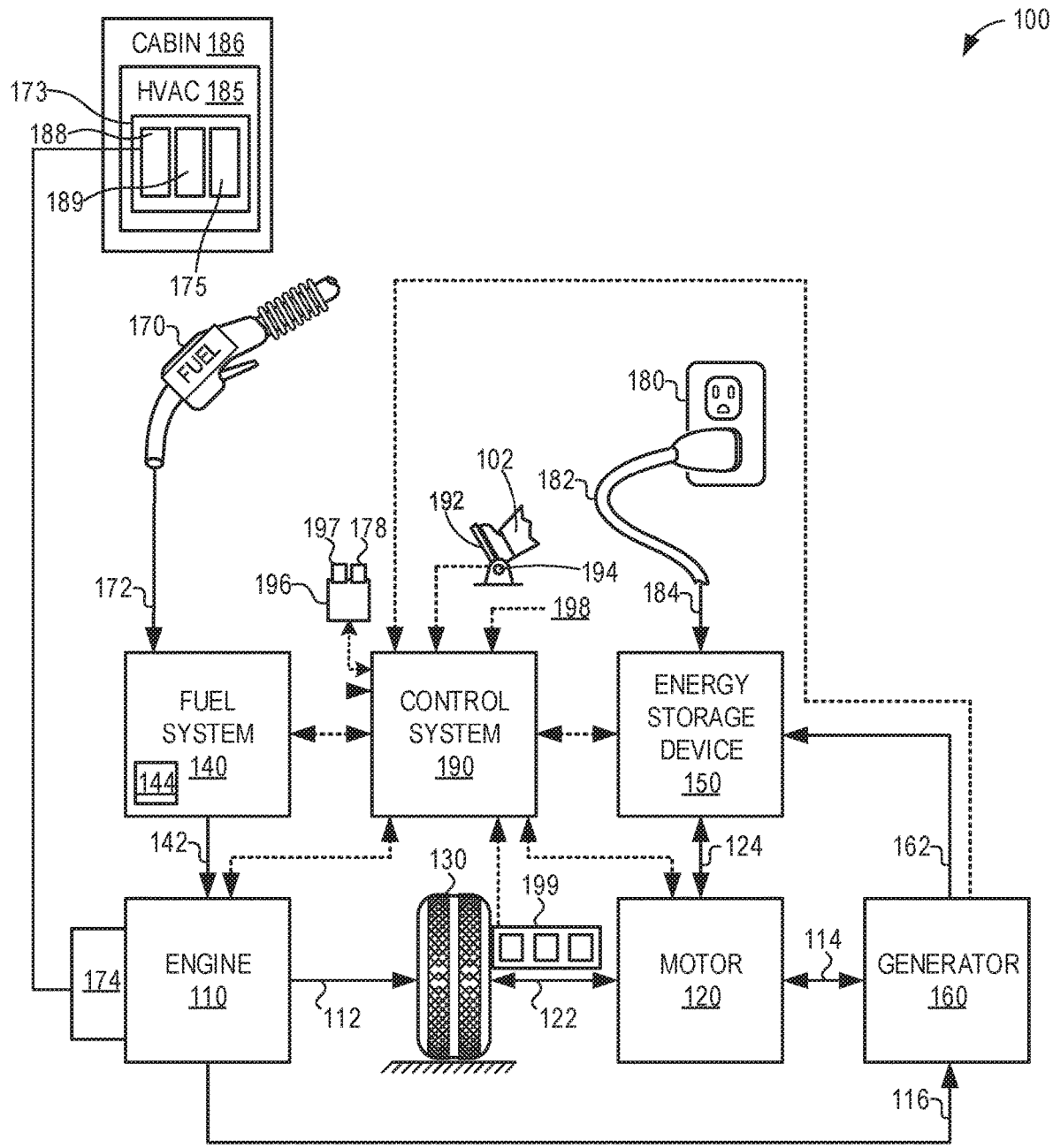
FIG. 1 shows an example hybrid vehicle system.
Figure 2:
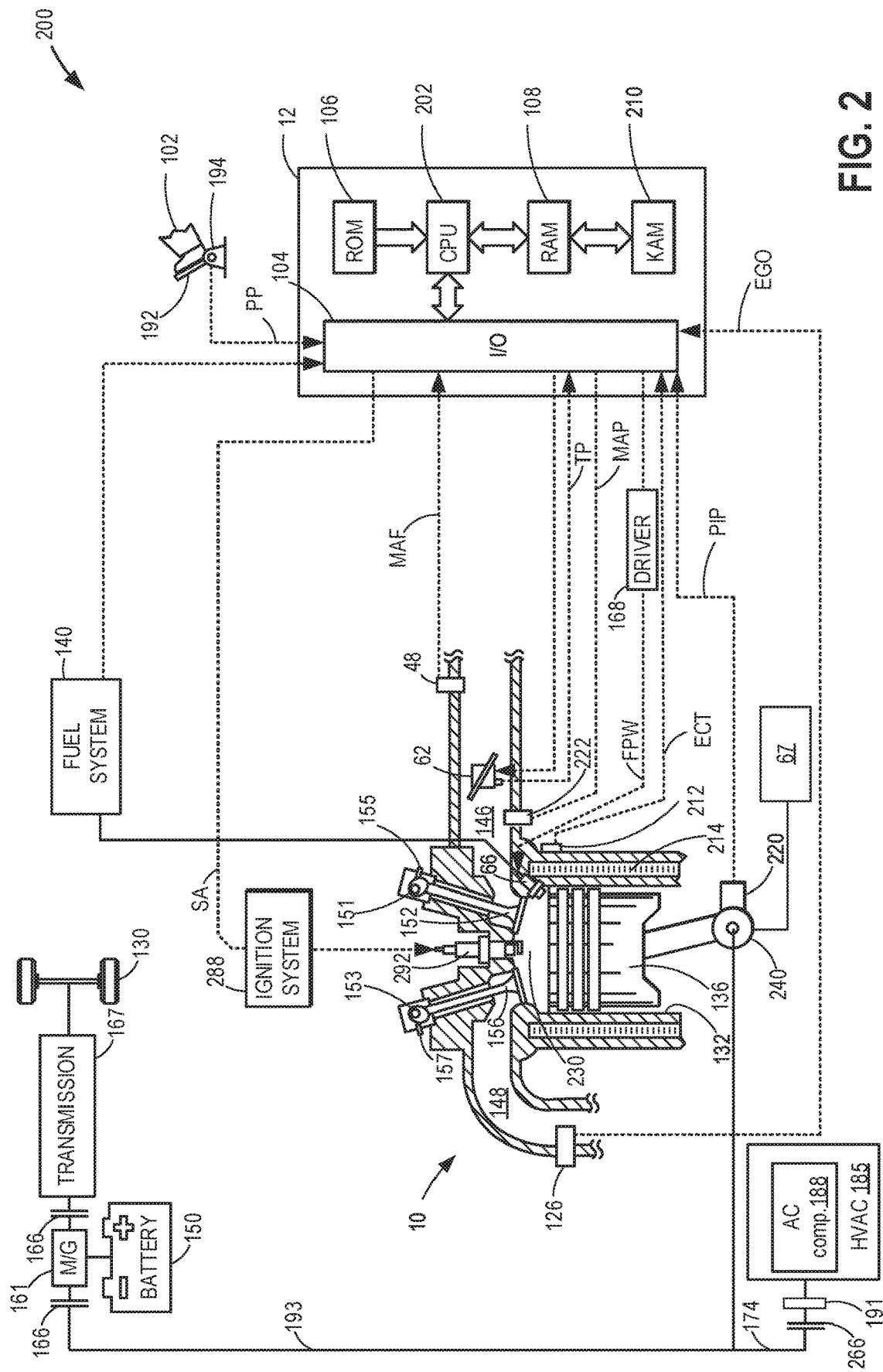
FIG. 2 shows an example engine system configured with start/stop capabilities.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130, as indicated by arrow 122, while engine 110 is deactivated.

During other operating conditions, engine 110 may be set to a deactivated state (as described above) while motor 120 may be operated to charge energy storage device 150. For example, motor 120 may receive wheel torque from drive wheel 130, as indicated by arrow 122, where the motor may convert the kinetic energy of the vehicle to electrical energy for storage at energy storage device 150, as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150, as indicated by arrow 162.

During still other operating conditions, engine 110 may be operated by combusting fuel received from fuel system 140, as indicated by arrow 142. For example, engine 110 may be operated to propel the vehicle via drive wheel 130, as indicated by arrow 112, while motor 120 is deactivated. During other operating conditions, both engine 110 and motor 120 may each be operated to propel the vehicle via drive wheel 130, as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels, and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120, which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110, as indicated by arrow 142. Still other suitable fuels or fuel blends may be supplied to engine 110, where they may be combusted at the engine to produce an engine output. The engine output may be utilized to propel the vehicle, as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from a pedal position sensor 194 that communicates with a pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170, as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197, which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Vehicle propulsion system 100 may also include a heating, ventilation, and air conditioning (HVAC) system 185. HVAC system 185 may be configured to provide a climate-controlled air flow to a cabin space 186 of the vehicle. The HVAC system 185 may include an air conditioning (AC) unit 173 having an AC compressor 188 and an evaporator 189. The AC compressor 188 is responsible for circulating refrigerant through evaporator coils. In the present example, compressor 188 is a non-electric compressor coupled to a front end accessory drive (FEAD) 174 of engine 10 via one or more belts and pulleys. As a result, compressor 188 is operated via engine 10, and therefore the compressor 188 does not operate when the engine is shut down. A blower 175 of the AC unit 173 draws air from the atmosphere and across the evaporator 189 coils where heat is extracted from the flowing air, the extracted heat used to heat the circulating liquid refrigerant. The heated refrigerant is then circulated to a condenser of the AC unit where the refrigerant is cooled so that it can be circulated through the evaporator again. The blower 175 settings as well as the rate at which refrigerant is circulated by the AC compressor 188 is determined as a function of cabin climate control settings selected by a vehicle operator via cabin climate control buttons 178 on vehicle instrument panel 196.

Vehicle 100 may be a start/stop vehicle wherein engine 110 is configured to be selectively deactivated when idle-stop conditions are met, such as when the vehicle is stopped at a traffic light and torque demand is reduced. At that time, engine fueling may be disabled and the engine may spin to rest. Then, when restart conditions are met, such as when the operator tips in, engine fueling may be resumed and the engine may spin up. The idle-stop operations enable fuel savings, a reduction in vehicle emissions, as well as a reduction in engine noise, vibration, and harshness (NVH).

As described above, the AC compressor 188 is driven by FEAD 174 and therefore cannot be operated when the engine is shutdown or idle-stopped. This can cause a conflict between start/stop operations desired for fuel economy and climate control action requested by a vehicle operator. In particular, in the case of an FEAD-driven AC compressor, the AC compressor functions while the engine is running to pressurize the refrigerant based on climate commands from customer settings to meet the desired cabin temperature. Once the engine is turned off, the compressor is not operated, which results in an increase in refrigerant temperature and higher resultant evaporator temperature. For a given blower speed setting, this can result in an unpleasant musty odor resulting from the elevated evaporator temperature getting transferred into the passenger cabin space 186 and a degradation in cabin space air quality. In addition, due to non-operation of the AC compressor, the cabin temperature may rise above a setting selected by the operator.

To address these issues, start/stop vehicles with a non-electric AC compressor may be configured with one or more climate control inhibits wherein the duration of the idle-stop is limited by a climate control parameter (such as an evaporator temperature limit). In order to avoid a higher than threshold increase of the evaporator temperature, and the resultant humidity and drop in air quality, the engine is restarted before the evaporator temperature limit is reached in order to ensure that the customer's comfort is not affected. However, this can reduce the engine-off time and the opportunity for fuel economy and emission savings.

The inventors herein have recognized that additional synergies between various start/stop parameters and operator inputs, in particular climate control inputs and driving inputs, can be leveraged to provide a better balance between climate control and fuel economy. For example, a first group of start/stop parameters, such as an evaporator temperature threshold inhibit of engine shutdown, can be adjusted as a function of an operator's climate control inputs received over a drive cycle, as well as a history of their climate control preferences. Another group of start/stop parameters, such as a brake or accelerator pedal threshold for engine shutdown, can be adjusted as a function of an operator's driving inputs received over a drive cycle, as well as their drive history. A further group of start/stop parameters, such as an engine coolant temperature threshold inhibit of engine shutdown, can be adjusted as a function of each of the operator's climate control preferences and their driving history. In each case, the operator preferences may be actively received or passively inferred. Further, based on their preferences, the thresholds may be raised or lowered such that in some cases, a duration of idle-stop can be extended by delaying the engine restart. By extending the duration of an idle-stop, fuel economy is improved. Example adjustments to the parameters in view of different user inputs are shown with reference to FIGS. 4-7. An example vehicle operation with the adjusted thresholds is shown at FIG. 8.

Control system 190 receives information from a plurality of sensors and sends control signals to a plurality of actuators. The plurality of sensors may include, for example, vehicle sensors 199, ambient humidity sensor 198, refueling button 197, pedal position sensor 194, climate control button 178, etc. The plurality of actuators may include fuel injectors, blower 175, AC compressor 188, motor 120, etc. The control system 190 may include a controller that receives input data from the various sensors, processes the input data, and triggers the actuators in response to the processed input data based on instruction or code programmed therein corresponding to one or more routines. An example control routine is described herein with regard to FIG. 3. In this way, the controller receives signals from the various sensors and employs the various actuators to adjust engine operation based on the received signals and instructions stored on a memory of the controller. As an example, responsive to aggressive driving by an operator, the engine coolant temperature threshold at which an engine has to be restarted from idle-stop can be lowered (so that the engine can cool off to a lower temperature while being shut down for a longer time). As another example, responsive to a driver preference for a cooler cabin setting, the engine coolant temperature threshold at which the engine has to be restarted from idle-stop can be lowered (so that the engine can cool off to a lower temperature while being shut down for a longer time).

Referring now to FIG. 2, it depicts a partial view of a single cylinder of internal combustion engine 10, which may be installed in a vehicle system 200. In one example, engine 10 is the same as engine 110 of FIG. 1, and vehicle system 200 is the same as vehicle system 100 of FIG. 1. Components previously introduced in FIG. 1 may be similarly numbered and not reintroduced.

Engine 10 is depicted with a combustion chamber (cylinder) 230, a coolant sleeve 214, and cylinder walls 132 with a piston 136 positioned therein and connected to a crankshaft 240. Combustion chamber 230 is shown communicating with an intake passage 146 and an exhaust passage 148 via a respective intake valve 152 and exhaust valve 156.

Each cylinder of engine 10 may include at least one intake valve 152 and at least one exhaust valve 154. Intake valve 152 and exhaust valve 156 may be controlled by a controller 12 (which may be the same as control system 190 of FIG. 1) using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve 152 is controlled by an intake cam 151 and each exhaust valve 156 is controlled by an exhaust cam 153. The position of intake valve 152 and exhaust valve 156 may be determined by valve position sensors 155 and 157, respectively.

In some embodiments, one or more of the intake and exhaust valve may be controlled by electric valve actuation. For example, cylinder 230 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example where cylinder 230 has two intake valves and two exhaust valves, intake cam 151 includes separate and different cam lobes that provide different valve profiles (e.g., valve timing, valve lift, duration, etc.) for each of the two intake valves of combustion chamber 230. Likewise, exhaust cam 153 may include separate and different cam lobes that provide different valve profiles (e.g., valve timing, valve lift, duration, etc.) for each of the two exhaust valves of combustion chamber 230. In another example, intake cam 151 may include a common lobe, or similar lobes, that provide a substantially similar valve profile for each of the two intake valves.

An exhaust gas sensor 126 is shown coupled to exhaust passage 148. Sensor 126 may be positioned in the exhaust passage upstream of one or more emission control devices (not shown). Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, gasoline particulate filter (GPF), various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 230 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 292 for initiating combustion. An ignition system 288 can provide an ignition spark to combustion chamber 230 via spark plug 292 in response to a spark advance signal SA from controller 12, under select operating modes. However, in some embodiments, spark plug 292 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 230 is shown including one fuel injector 66. Fuel injector 66 is shown coupled directly to combustion chamber 230 for injecting fuel directly therein in proportion to a pulse width of signal FPW received from controller 12 via an electronic driver 168. In this manner, fuel injector 66 provides what is known as direct injection (hereafter also referred to as "DI") of fuel into combustion cylinder 230. While FIG. 2 shows injector 66 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 230.

Fuel may be delivered to fuel injector 66 from a high pressure fuel system 140 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 140 may hold fuel with different fuel qualities, such as different fuel compositions. These differences may include different alcohol content, different octane, different heat of vaporizations, different fuel blends, and/or combinations thereof etc. In some embodiments, fuel system 140 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 102 via an input device, such as an accelerator pedal 192. The input device includes a pedal position sensor 194 that sends a pedal position (PP) signal to controller 12. Controller 12 is shown in FIG. 2 as a microcomputer, including a microprocessor unit 202, input/output ports 104, an electronic storage medium for executable programs and calibration values shown as a read only memory 106 in this particular example, random access memory 108, keep alive memory 210, and a data bus. Storage medium read-only memory 106 can be programmed with computer readable data representing instructions executable by microprocessor 202 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from a Hall effect sensor 220 (or other type) coupled to crankshaft 240; throttle position (TP) from a throttle position sensor; absolute manifold pressure signal (MAP) from a MAP sensor 222, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from manifold pressure sensor 222 may be used to provide an indication of vacuum, or pressure, in the intake manifold.

Based on input from one or more of the above-mentioned sensors, controller 12 may adjust one or more actuators, such as fuel injector 66, a throttle 62, spark plug 292, intake/exhaust valves and cams, etc. The controller may receive input data from the various sensors, process the input data, and trigger the actuators in response to the processed input data based on instruction or code programmed therein corresponding to one or more routines.

In some examples, vehicle 200 may be a hybrid vehicle with multiple sources of torque available to one or more vehicle wheels 130. In other examples, vehicle 200 is a conventional vehicle with only an engine, or an electric vehicle with only electric machine(s). In the example shown in FIG. 2, vehicle 200 includes engine 10 and an electric machine 161 coupled along a main drivetrain 193. Main drivetrain 193 is coupled to a first end of crankshaft 240 and includes components that drive the vehicle wheels 130. Electric machine 161 may be a motor or a motor/generator and thus may also be referred to herein as an electric motor. Crankshaft 240 of engine 10 and electric machine 161 are connected via a transmission 167 to vehicle wheels 130 when one or more clutches 166 are engaged. In the depicted example, a first clutch 166 is provided between crankshaft 240 and electric machine 161, and a second clutch 166 is provided between electric machine 161 and transmission 167. Controller 12 may send a signal to an actuator of each clutch 166 to engage or disengage the clutch, so as to connect or disconnect crankshaft 240 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 150 to provide torque to vehicle wheels 130. Electric machine 161 may also be operated as a generator to provide electrical power to charge battery 150, for example during a braking operation.

A front end accessory drive (FEAD) 174 is coupled to a second, opposite end of crankshaft 240. The second end, or accessory drive end, is a free end, or an exposed end of the crankshaft that is free and drives one or more auxiliary apparatuses (e.g., accessories) via a tensioning device 191 (e.g., a belt, chain, etc.) coupled to one or more auxiliary pulleys (not shown). As such, this end lies opposite to the end of the crankshaft that drives the vehicle. One or more clutches 266 may couple the FEAD 174 to various auxiliary devices or actuators driven by the FEAD 174. In one example, as depicted, the FEAD 174 drives an air conditioning (AC) compressor 188 of a heating ventilation and air conditioning (HVAC) system 185 of the vehicle. The HVAC system is a coolant and/or refrigerant based system including additional blowers, condensers, and pumps which is configured to provide vehicle cabin cooling or heating based on operator input (such as based on an operator selected cabin temperature setpoint). When operated, the AC compressor 188 compresses refrigerant flowing through an HVAC refrigerant line, so as to convert gaseous refrigerant to liquid refrigerant, before liquid refrigerant is directed to an AC evaporator for cabin cooling. While the example shows the AC compressor 188 as the auxiliary apparatus or actuator driven by the FEAD 174, this is not meant to be limiting. The FEAD 174 may similarly drive one or more other or additional auxiliary apparatuses including a camshaft, an alternator, a power steering compressor, an automatic transmission hydraulic fluid pump (e.g., oil pump), etc.

As such, climate control performance of the vehicle can be heavily impacted by start/stop functions. As the engine shuts down, the AC compressor stops functioning as it is belt driven by the engine. Due to the physics of the engine-off behavior with mechanical AC compressors, this can drive many climate control inhibits for start/stop to ensure that customer satisfaction of climate control is maintained. As elaborated with reference to FIG. 3, climate control inhibits may include an evaporator temperature inhibit since the compressor is not working, which results in an increase in refrigerant temperature and higher resultant evaporator temperature. Also, a cabin temperature inhibit may be included that monitors the cabin temperature through a sensor and constantly compares the measured value versus the customer selected setting. Start/stop operations may also drive a blower ramp down strategy during an idle-stop operation so as to ensure that the fan output is not high enough to drive a high evaporator temperature while also reducing electrical loads when auto-stopped to allow for longer engine-off time.

In this way, the components of FIGS. 1-2 enable a vehicle system comprising: an engine; a heating, ventilation, and air conditioning (HVAC) system; and a controller storing executable instructions on non-transitory memory that, when executed, cause the controller to: adjust idle-stop conditions based on cabin climate control preferences of a current driver, the cabin climate control preferences learned over a plurality of drive cycles including the current drive cycle; enable idle-stop responsive to idle-stop conditions being met; and inhibit idle-stop responsive to idle-stop conditions not being met. In one example, the idle-stop conditions include an evaporator temperature being less than an evaporator temperature threshold, an ambient temperature being greater than a lower ambient temperature and less than an upper ambient temperature threshold, a cabin temperature being greater than a lower cabin temperature threshold and an upper cabin temperature threshold, and an engine coolant temperature being greater than an engine coolant temperature threshold. Further, the HVAC system may include an air conditioning compressor driven by a front-end accessory drive of the engine, and to adjust the idle-stop conditions based on the cabin climate control preferences of the current driver, the controller includes further instructions stored in non-transitory memory that, when executed, cause the controller to:

decrease the evaporator temperature threshold responsive to the cabin climate control preferences of the current driver indicating aggressive climate control; and increase the evaporator temperature threshold responsive to the cabin climate control preferences of the current driver indicating passive climate control. To adjust the idle-stop conditions based on the cabin climate control preferences of the current driver, the controller may include further instructions stored in non-transitory memory that, when executed, cause the controller to: increase the engine coolant temperature threshold responsive to the cabin climate control preferences of the current driver indicating aggressive climate control; and decrease the engine coolant temperature threshold responsive to the cabin climate control preferences of the current driver indicating passive climate control. The controller may include still further instructions stored in non-transitory memory that, when executed, cause the controller to: further adjust the engine coolant temperature threshold based on an aggressiveness of a driving style of the current driver, the aggressiveness learned over the plurality of drive cycles including the current drive cycle, including decreasing the engine coolant temperature as the aggressiveness increases.

Figure 3:
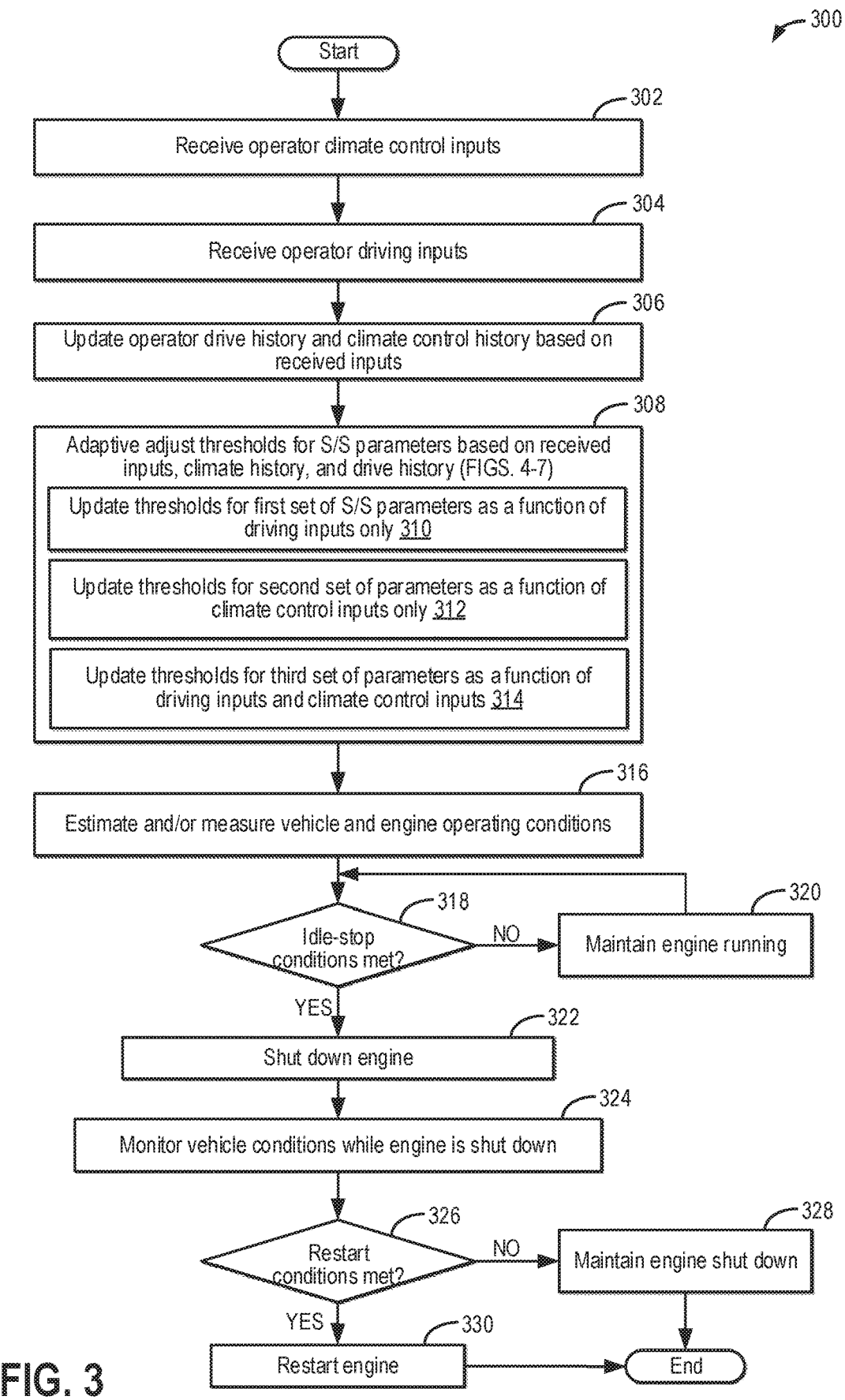
FIG. 3 shows a high-level flow chart of an example method for extending a duration of engine idle-stopping via adjustment of climate control inhibits.

Turning now to FIG. 3, an example method 300 is shown for adaptively updating one or more start/stop parameters of an engine based on driving and climate control habits of a vehicle operator. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation according to the methods described below.

At 302, the method includes receiving operator climate control inputs. These may include, for example, operator-specified cabin temperature settings as well as blower settings over a current drive cycle. For example, it may be learned whether the operator likes the average cabin temperature to be cooler (e.g., at or around 60° F. and/or with a higher blower fan setting) or warmer (e.g., at or around 70° F. and/or with a lower blower fan setting). The settings may be learned as a function of ambient temperature to identify seasonal preferences. For example, it may be determined if the operator likes the cabin temperature to be cool on a hot day or independent of ambient temperature (such as on hot and cold days). Likewise, settings may be learned as a function of time of day to identify diurnal preferences, such as whether the operator likes the cabin temperature to be cool all day long, only during mid-afternoons, only on a morning or evening section of a commute, etc.

In addition to learning the specific climate control settings selected by the operator, the vehicle controller may also learn any changes made to the settings. For example, it may be learned if the operator adjusts the settings after having made an initial selection (such as by frequently adjusting the temperature and/or blower settings), or leaves the settings as is.

At 304, the method includes receiving operator driving inputs. These may include, for example, inputs related to the operator's driving behavior and style over a drive cycle, such as whether they are a more aggressive or a more passive driver. Example inputs include a frequency of brake and/or accelerator pedal application, a frequency of shifting between brake and accelerator pedals, an average displacement of the brake and accelerator pedal on each pedal event, etc. Other inputs include a frequency of transmission gear shifts (e.g., rate of gear upshifting and downshifting), gear selection, etc.

At 306, the method includes updating the operator's drive history and climate control history based on the received inputs. As an example, the controller may store the input climate control settings and driving inputs in memory, such as according to date and time and the vehicle operator, to create a climate control history and a drive history, respectively, for that individual operator. For example, the controller may identify the current operator based on a mobile device associated with that particular operator (e.g., cell phone, unique key, etc.). As another example, a vision system may observe and identify the operator, such as using facial recognition. As still another example, the operator or other occupant may input the identity of the current operator via an interface (e.g., vehicle instrument panel 196 of FIG. 1). As such, each time the vehicle is operated, the controller may determine the current operator and then update the current operator's climate control history with received climate control inputs and update the current operator's drive history with received driving inputs. As another example, the controller may analyze the operator's climate control history and drive history for trends. For example, the operator's climate preferences may be updated to indicate an average temperature setting (e.g., a cabin temperature setting averaged across all prior drive cycles), an average blower setting, a preference for air conditioning over cabin heating, etc. In one example, the drive history and the climate control history may be updated using models, algorithms, artificial intelligence, and machine learning.

At 308, the method includes adaptively adjusting thresholds for one or more engine idle start/stop (S/S) parameters based on the received operator inputs and the updated drive history and climate control history. Adaptively adjusting the thresholds may include raising or lowering the thresholds in real-time based on the operator inputs. Different groups of parameter thresholds may be adjusted differently based on one or more of the climate control and driving inputs received from the operator and, in some examples, one or more of the operator's drive history and climate control history. In particular, thresholds for a first set of start/stop parameters may be adjusted as a function of the driving inputs alone at 310. Thresholds for a second, different set of start/stop parameters may be adjusted as a function of the climate control inputs alone at 312. Thresholds for a third set of start/stop parameters, different from each of the first and second set, may be adjusted as a function of each of the climate control and driving inputs at 314. Because the start/stop parameter thresholds determine the conditions for idle-stop, as will be further described below at 318, adjusting the thresholds for the start/stop parameters may also be referred to herein as adjusting idle-stop conditions.

Figure 4:
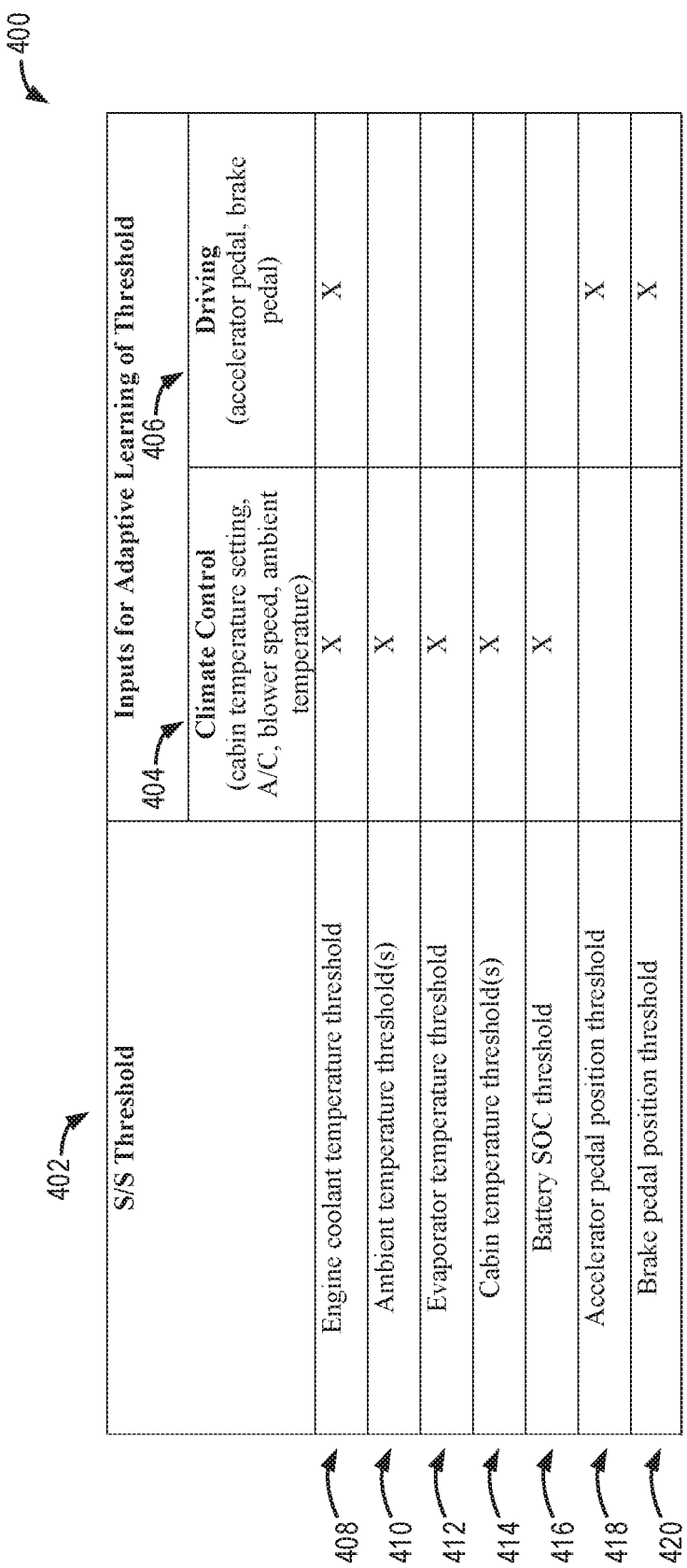
FIG. 4 shows a table of example start/stop parameters whose thresholds are affected by driving inputs, climate control inputs, or a combination thereof.

Turning briefly to FIG. 4, a table 400 of FIG. 4 tabulates example start/stop parameters whose thresholds are adjusted as a function of the distinct inputs. A first column 402 lists example start/stop thresholds, a second column 404 indicates use of climate control inputs for adaptive learning of a corresponding threshold, and a third column 406 indicates use of driving inputs for adaptive learning of the corresponding threshold. As an example, the climate control inputs may include a cabin temperature setting, whether air conditioning is activated, a blower speed, and ambient temperature. As another example, the driving inputs may include an accelerator pedal and a brake pedal. Each of rows 408, 410, 412, 414, 416, 418, and 420 denotes a particular example start/stop threshold (or set of thresholds) and whether or not that start/stop threshold is adaptively learned using the corresponding inputs (e.g., by the presence or absence of an "X").

For example, row 408 shows that an engine coolant temperature start/stop threshold is adjusted based on both climate control inputs and driving inputs during adaptive learning of the threshold. In contrast, ambient temperature start/stop threshold(s) (row 410), an evaporator temperature start/stop threshold (row 412), cabin temperature start/stop threshold(s) (row 414), and a battery state of charge (SOC) threshold (row 416) are adjusted based on climate control inputs only during the adaptive learning and not based on driving inputs. Similarly, an accelerator pedal position threshold (row 418) and a brake pedal position threshold (row 420) are adjusted based on driving inputs only during the adaptive learning and not based on the climate control inputs. The climate control inputs and/or the driving inputs may include a climate control history and a drive history in addition to currently received climate control inputs and driving inputs, at least in one example.

Further, the ambient temperature threshold(s) (row 410) may include a lower ambient temperature threshold and a higher ambient temperature threshold, as will be further described below with respect to FIG. 6. The resulting temperature range defined between the lower ambient temperature threshold and the higher ambient temperature threshold may be an ambient temperature range in which start/stop is enabled, whereas start/stop may be inhibited outside of the defined ambient temperature range. Similarly, the cabin temperature threshold(s) (row 414) may include a lower cabin temperature threshold and a higher cabin temperature threshold that may be centered around a cabin temperature setpoint (e.g., set by the vehicle operator). The resulting temperature range defined between the lower cabin temperature threshold and the higher cabin temperature threshold may be a cabin temperature range in which start/stop is enabled, whereas start/stop may be inhibited outside of the defined cabin temperature range. Additionally or alternatively, the cabin temperature threshold may include a threshold change (e.g., in either a positive or negative direction) from the cabin temperature setpoint.

As an illustrative example, the engine coolant temperature start/stop threshold inhibits idle-stop for maintaining cabin heater performance such that idle-stop is inhibited when the engine coolant temperature is less than the engine coolant temperature start/stop threshold. Additionally, the engine is restarted from rest during an idle-stop in response to the engine coolant temperature falling below the engine coolant temperature start/stop threshold. A controller (e.g., controller 12 of FIG. 2) may make a first adjustment to the engine coolant temperature start/stop threshold based on the ambient temperature and the cabin temperature setting. As an example, the controller may initially determine the engine coolant temperature start/stop threshold as the lowest engine coolant temperature that can provide the operator-requested cabin temperature setting based on the ambient temperature, such as via a look-up table, algorithm, or map. The controller may make a second adjustment to the engine coolant temperature start/stop threshold based on driving inputs (e.g., pedal position and operator-specific drive history), as driving aggressiveness may affect how quickly the engine will heat up. As such, the engine coolant temperature start/stop threshold may be decreased for an operator with an aggressive driving style (e.g., as determined based on the drive history) relative to an operator with a passive driving style, as the aggressive driving style is expected to heat up the engine more quickly. The controller may further adjust the engine coolant temperature start/stop threshold based on the climate control history of the operator. For example, the engine coolant temperature start/stop threshold may be increased for an operator who favors cabin comfort, such as an operator who adjusts the climate control settings in response to a change in cabin temperature during an idle-stop (e.g., aggressive climate control, as further described below with respect to FIGS. 6 and 7). Conversely, the engine coolant temperature start/stop threshold may be decreased (or at least not further increased) for an operator who does not react to changes in cabin temperature during an idle-stop (e.g., passive climate control, as further described below with respect to FIGS. 6 and 7).

Returning to FIG. 3, in some examples, the controller may use the driving inputs and the climate control inputs to select a mode of operation. For example, if the inputs indicate a preference for fuel economy, then a fuel economy mode may be selected, and start/stop parameter thresholds may be adjusted in accordance with the fuel economy mode. As another example, if the inputs indicate a preference for climate control performance (or vehicle performance), then a performance mode may be selected, and start/stop parameter thresholds may be adjusted in accordance with the performance mode.

As an example of the first set of parameters, thresholds for accelerator pedal position and brake pedal position may be adjusted as a function of driving inputs only. Table 500 of FIG. 5 shows an example of how thresholds for a first set of start/stop parameters may be adjusted based on driving preferences, as indicated based on operator driving inputs received on a current drive cycle as well as from drive history. In particular, table 500 compares the change in brake and accelerator pedal position thresholds for an aggressive driver versus a passive driver. Here it is inferred that the aggressive driver tends to favor performance over fuel economy while the passive driver tends to favor fuel economy over performance. Thus, for a driver who tends to be lead-footed and drives more aggressively (with frequent tip-ins and tip-outs and frequent shifts between application and release of the accelerator and brake pedals), the thresholds may be adjusted so that the engine is shutdown less often and/or for a shorter duration in anticipation of a change in operator torque demand. In particular, for the aggressive driver, the engine is shutdown only after the accelerator pedal has been released to a larger degree and/or a brake pedal has been depressed to a larger degree as compared to a passive driver. In other words, an engine shutdown is inhibited earlier as compared to the case of a passive driver. This is because in the case of the aggressive driver, an accelerator pedal depression is anticipated shortly after an accelerator pedal release or brake pedal depression. In comparison, for the passive driver, such sudden and large fluctuations in torque demand are not anticipated. In one example, a highest possible pedal position threshold may be applied when the performance mode is selected while a lowest possible pedal position threshold may be applied when the fuel economy mode is selected. By adjusting the brake and accelerator position thresholds based on driving inputs, inadvertent engine shutdowns and restarts may be reduced. As a result, fuel usage, vehicle emissions, and wear to the cranking system may be reduced, and vehicle operator satisfaction may be increased.

As an example of the second set of parameters, thresholds for evaporator temperature or cabin temperature may be adjusted as a function of climate control inputs only. Table 600 of FIG. 6 shows an example of how thresholds for a second set of start/stop parameters may be adjusted based on climate control settings and preferences, as indicated based on operator climate inputs received on a current drive cycle as well as from climate control setting history. In particular, table 600 compares the change in evaporator temperature, cabin temperature, and ambient temperature start/stop thresholds for a driver who tends to aggressively control the climate settings versus a driver who tends to passively control the climate settings. As an example, the driver having aggressive climate control tendencies may prefer a cooler cabin on a hot day or a warmer cabin on a cold day, may select a higher blower setting, and/or may more frequently adjust the climate control settings (compared with a driver having passive climate control tendencies). As another example, the driver having passive climate control tendencies may select a more mild cabin temperature setting, such as a temperature that is closer to ambient temperature, and/or may select a lower blower setting. Further, the driver having aggressive climate control tendencies may adjust the climate control settings in response to a change in cabin temperature during an idle-stop, whereas the driver having passive climate control tendencies may not react to variations in cabin temperature during an idle-stop.

Here, it is inferred that the driver having aggressive climate control tendencies favors climate performance over fuel economy while the driver having passive climate control tendencies favors fuel economy over performance. Further, it will be appreciated that the climate control inputs may be evaluated as a function of ambient temperature. Thus, a driver who selects a cooler cabin (and/or higher blower settings) at higher ambient temperatures may have a similar preference for climate control performance (over fuel economy) as a driver who selects warmer cabin (and/or higher blower settings) at lower ambient temperatures. Likewise, a driver who selects a warmer cabin (and/or lower blower settings) at higher ambient temperatures may have a similar preference for fuel economy (over climate control performance) as a driver who selects a cooler cabin (and/or lower blower settings) during cooler ambient temperatures.

For a driver with aggressive climate control tendencies, the thresholds may be raised so that the engine is shutdown less often, and/or for a shorter duration in anticipation of a drop in customer satisfaction when a FEAD-driven HVAC unit is turned off during an engine shutdown. In particular, for the driver whose climate control preferences favor climate control performance, the engine is restarted from a shutdown when the cabin temperature has changed by a smaller amount (e.g., a lower threshold temperature change) as compared to a driver whose climate control preferences favor fuel economy. In other words, an engine shutdown is inhibited earlier and/or an engine restart from shutdown is initiated earlier in the former case. As an illustrative example, in the case of the driver with aggressive climate control tendencies on a hot day, a larger degree of discomfort is anticipated due to a rise in evaporator temperature associated with disabling of the HVAC unit compressor at the shutdown. Similarly, on a cold day, a larger degree of discomfort is anticipated due to the engine cooling and being unable to provide adequate heat to the driver during the shutdown. In comparison, for the driver with passive climate control preferences, a degree of change in cabin air quality and temperature may be acceptable if it improves the vehicle's fuel economy.

As another example, while air conditioning is active, the evaporator temperature affects the temperature of the resulting air delivered to the passenger cabin. Therefore, an evaporator temperature start/stop threshold, above which start/stop is inhibited, may also be adjusted based on the driver's current climate inputs and climate control history. For a driver having aggressive climate control tendencies, the evaporator temperature start/stop threshold may be decreased in order to reduce the air temperature rise during the auto-stop. Conversely, for a driver having passive climate control tendencies, the evaporator temperature start/stop threshold may be increased, allowing the evaporator temperature to further increase before the engine is restarted to operate the AC compressor, enabling a longer idle-stop duration but resulting in the cabin temperature further increasing during the idle-stop. As a further example, a lowest possible evaporator temperature threshold may be applied when a performance mode is selected while a highest possible evaporator temperature threshold may be applied when a fuel economy mode is selected.

In addition to adjusting the thresholds for one or more climate-based start/stop parameters, a blower ramp down setting may also be varied based on the climate control inputs, which may in turn affect a battery SOC start/stop threshold. For example, a slower blower ramp-down may be enabled when the climate control inputs indicate a preference for climate control performance over fuel economy (e.g., a driver with aggressive climate control tendencies), whereas a higher blower ramp-down may be selected when the climate control inputs indicate a preferences for fuel economy over climate control performance (e.g., a driver with passive climate control tendencies). The higher blower ramp-down rate applied for the driver having passive climate control tendencies (and/or when operating in the fuel economy mode) ensures that the evaporator temperature start/stop threshold is not reached and electrical loads are less during the idle-stop. This may provide basic climate functionality during the idle-stop while maximizing the idle-stop duration. As such, the battery SOC start/stop threshold may be decreased when the higher blower ramp down rate is used due to the decreased electrical loads.

In some examples, the strategy for adjusting the blower settings and evaporator thresholds may be made more robust by relying on sensed occupant information, such as occupant weight detection, to determine how many occupants are in the vehicle. Vent settings may be adjusted in accordance. For example, if there is a single occupant in the vehicle (e.g., only the driver), the controller may automatically adjust the climate control settings so as to maintain only the driver vent active while shutting off all other vents, such as all rear seat vents.

In still another example, ambient temperature start/stop thresholds may be adjusted based on driver climate control preferences. The ambient temperature start/stop thresholds may include a first, lower ambient temperature start/stop threshold and a second, higher ambient temperature start/stop threshold. Start/stop may be inhibited at ambient temperatures below the lower ambient temperature start/stop threshold and above the higher ambient temperature start/stop threshold. For example, the ambient temperature start/stop thresholds may prevent idle-stops during extreme ambient temperature conditions (e.g., very cold or very hot) in order to prevent the resulting climate control degradation. As such, for a driver with aggressive climate control tendencies (e.g., who prefers climate control performance over fuel economy), the lower ambient temperature start/stop threshold may be increased while the higher ambient temperature start/stop threshold may be decreased, narrowing an ambient temperature range during which start/stop is enabled. In contrast, for a driver with passive climate control tendencies (e.g., who prefers fuel economy over climate control performance), the lower ambient temperature start/stop threshold may be decreased while the higher ambient temperature start/stop threshold may be increased, expanding the ambient temperature range during which start/stop is enabled.

Further, it may be appreciated that a driver may not strictly exhibit aggressive climate control tendencies or strictly exhibit passive climate control tendencies. As an example, the driver may more aggressively adjust the climate control settings during hot ambient temperature conditions compared with cold ambient temperature conditions. Such condition-to-condition differences may be accounted for via an adaptive model that is developed out of the driver's climate control habits and learns the driver's climate control preferences and tendencies throughout various conditions. Further, the extent to which the various start/stop parameter thresholds are increased or decreased may be based on the degree of climate control aggressiveness or passiveness of the driver for that particular climate condition (e.g., ambient temperature condition, cabin temperature setting, etc.).

For still other parameters, there may be synergies possible based on climate control inputs and driving inputs that allow for improved climate control performance with improved fuel economy. As an example of the third set of parameters, start/stop thresholds for engine coolant temperature (herein also referred to as engine warming inhibits) may be adjusted as a function of each of climate control inputs and driving inputs, as shown in able 700 of FIG. 7. The engine coolant temperature start/stop threshold defines an engine coolant temperature below which start/stop is inhibited. As such, it may be desired for the engine to be warm enough to allow for improved exhaust emissions and engine performance. In addition, if the engine is warm enough, then there may be residual heat available to warm a cabin when cabin heating is requested, even if the engine is shut down. Therefore, the engine coolant temperature start/stop threshold setting may affect heater performance and therefore cabin temperature.

For an aggressive driver, it may be inferred that due to aggressive driving habits, the engine coolant temperature may increase more rapidly. Therefore, even if the engine temperature drops during an idle-stop, it may be assumed that when the engine is restarted, the aggressive driving habits may rapidly warm up the coolant. Thus, for the aggressive driver, the engine coolant temperature start/stop threshold can be lowered. In contrast, for a passive driver, whose driving style may result in the engine coolant temperature increasing more slowly upon engine restart, the engine coolant temperature start/stop threshold may be increased.

However, the driver's climate control preferences also affect the engine coolant temperature start/stop threshold setting. For a driver with aggressive climate control preferences, the engine coolant temperature start/stop threshold may be increased in order to prevent or reduce heater performance degradation. For a driver with passive climate control preferences, the engine coolant temperature start/stop threshold may be decreased, as heater performance degradation may be less of a concern. Thus, for an aggressive driver having aggressive climate control tendencies or a passive driver having passive climate control tendencies, the directionality of the driving input adjustment and the climate control input adjustment may be conflicting, resulting in a smaller adjustment to the engine coolant temperature start/stop threshold than if only driving inputs or only climate control inputs were used.

It will be appreciated that when applied, the engine warming inhibits (that is, the engine coolant temperature value-based inhibit that remains active until the engine is warm enough for heater performance) may be further adapted as a function of the ambient temperature and the cabin temperature setting, as further described above with respect to FIG. 4. Therein, the controller may determine the lowest engine coolant temperature that it can provide sufficient heat for the driver while auto-stopping. In this way, the controller can provide more availability for engine idle-stops at the beginning of a drive cycle.

Returning to FIG. 3, at 316, method 300 includes estimating and/or measuring vehicle and engine operating conditions. The operating conditions may include, for example, vehicle speed, a state of charge (SOC) of a system battery (e.g., energy storage device 150 of FIG. 1), engine status (e.g., on or off), engine load, engine coolant temperature, engine speed, torque demand (e.g., based on an accelerator pedal position), a brake demand (e.g., based on a brake pedal position), ambient conditions (such as ambient temperature, pressure, humidity, etc.) and the climate control settings (e.g., determined based on the climate control inputs received at 302).

At 318, it is determined if idle-stop conditions are met. For example, the controller may compare a plurality of start/stop parameters to corresponding thresholds to determine if idle-stop conditions are met. The idle-stop conditions may include, for example, the brake pedal position being greater than a brake pedal position start/stop threshold, the accelerator pedal position being less than an acceleration pedal position start/stop threshold, the battery SOC being above a battery SOC start/stop threshold, vehicle speed being less than a threshold speed (e.g., below 5 mph), the engine coolant temperature being greater than the engine coolant temperature start/stop threshold, the ambient temperature being between an upper ambient temperature start/stop threshold and a lower ambient temperature start/stop threshold, the cabin temperature being within a threshold of the cabin temperature setting, and the evaporator temperature being less than an evaporator start/stop temperature threshold. As described in detail above and with respect to FIGS. 4-7, the start/stop parameter thresholds may be adjusted based on one or more of driving inputs, climate control inputs, the operator's climate control history, and the operator's drive history such that the threshold values may be custom to the particular vehicle operator. As an example, all of the idle-stop conditions may be confirmed for idle-stop to be initiated. As a further example, some of the idle-stop parameters may be specific to a vehicle operating condition. For example, the evaporator temperature may be an idle stop parameter only when the air conditioning system is operating.

If the idle-stop conditions are not met, such as when at least one of the idle-stop conditions is not met, method 300 proceeds to 320 and includes maintaining the engine running. For example, fuel and spark will continue to be provided to the engine cylinders to produce combustion torque. Method 300 may then return to 318 to continue evaluating whether the idle-stop conditions are met.

If the idle-stop conditions are met, such as when all of the idle-stop conditions are met, method 300 proceeds to 322 and includes shutting down the engine. For example, the controller may automatically (that is, without the vehicle operator requesting engine shutdown) deactivate engine fueling and spark, ceasing combustion within the engine cylinders, and spin the engine to rest.

At 324, method 300 includes monitoring vehicle conditions while the engine is shut down. For example, the controller may continue to monitor the plurality of idle-stop parameters, including the brake pedal position, the accelerator pedal position, the battery SOC, the vehicle speed, the engine coolant temperature, the ambient temperature, the cabin temperature, and the evaporator temperature.

At 326, method 300 includes determining if engine restart conditions are met. As an example, engine restart conditions may be met when at least one idle-stop condition is no longer met. While monitoring the vehicle conditions during the idle-stop, the controller may compare the idle-stop parameters to their corresponding thresholds, for example, to determine if restart conditions are met. The restart conditions may also be referred to herein as start/stop inhibits. The restart conditions may include, for example, the brake pedal position dropping below the brake pedal position start/stop threshold, the accelerator pedal position increasing above the acceleration pedal position start/stop threshold, the battery SOC decreasing below the battery SOC start/stop threshold, vehicle speed increasing above the threshold speed, the engine coolant temperature falling below the engine coolant temperature start/stop threshold, the ambient temperature being outside of the upper ambient temperature start/stop threshold and the lower ambient temperature start/stop threshold, the cabin temperature changing more than a threshold amount from the cabin temperature setting, and the evaporator temperature increasing above the evaporator start/stop temperature threshold. As mentioned above, any or all of the restart conditions may be met for an engine restart to be initiated.

If the engine restart conditions are not met, method 300 proceeds to 328 and includes maintaining the engine shut down. The engine will remain at rest, without fuel supplied to the engine and without combustion occurring within the engine cylinders. By maintaining the engine shut down when restart conditions are not met (e.g., no start/stop inhibits are present), vehicle fuel economy may be increased while emissions are decreased. Method 300 may then end.

If instead the engine restart conditions are met, method 300 proceeds to 330 and includes restarting the engine. Restarting the engine may include, for example, cranking the engine to a non-zero speed with an electric motor (e.g., electric machine 161 of FIG. 2) and initiating combustion in the engine cylinders via fuel delivery and spark. By enabling the automatic engine restart when the engine restart conditions are met (e.g., one or more start/stop inhibits are present during an idle-stop), the engine may be quickly respond to operator torque requests as well as provide climate control functionality according to the operator's preferences. Following 330, method 300 ends.

FIGS. 8 and 9 show example adjustments of start/stop parameter thresholds based on drive inputs, a drive history, climate control inputs, and a climate control history for two different drivers. Turning first to FIG. 8, timeline 800 shows start/stop control of an engine of a vehicle for a first driver, the first driver having generally passive driving habits and generally passive climate control preferences. Accelerator pedal position (PP) is shown in plot 802, engine status is shown in plot 804, engine coolant temperature (ECT) is shown in plot 806, a temperature of an AC unit evaporator (T_evap) is shown in plot 808, cabin temperature (T_cabin) is shown in plot 810 along a cabin temperature setting (dashed plot 811), an HVAC mode selected by the driver is shown in plot 812, and ambient temperature (T_amb) is shown in plot 814.

For all of the above, the horizontal axis represents time, with time increasing along the horizontal axis from left to right. The vertical axis represents each labeled parameter. For plots 802, 806, 808, 810, and 814, the labeled parameter increases along the vertical axis from bottom to top. For plot 804, the vertical axis shows whether the engine is on (e.g., labeled "on," with combustion occurring in engine cylinders) or off for an idle-stop (e.g., labeled "idle-stop," where combustion is discontinued and the engine is allowed to spin to rest). For plot 812, the vertical axis shows the selected HVAC mode (e.g., "AC" or "heat," as labeled). Additionally, the start/stop parameter thresholds illustrated in the example of timeline 800 include an accelerator pedal position threshold (dashed line 818), an engine coolant temperature threshold (dashed line 820), an evaporator temperature threshold (dashed line 822), a lower cabin temperature threshold (dashed line 824), an upper cabin temperature threshold (dashed line 826), a lower ambient temperature threshold (dashed line 828), and an upper ambient temperature threshold (dashed line 830). Each of these thresholds may be learned/adjusted based on the first driver's habits and preferences, as described above with reference to FIGS. 3-7. Note that additional start/stop parameters and their thresholds may be present, although not illustrated (such as a brake pedal position and a corresponding threshold, battery SOC and a corresponding threshold, etc.).

Between time t0 and time t1, the engine is on and operating (plot 804) to provide driver-demanded torque, determined based on the accelerator pedal position (plot 802). For example, a current drive cycle may have begun shortly before time t0. The ambient temperature (plot 814) is low, and due to the cold ambient temperature, the driver has requested cabin heating (plot 812). Thus, the HVAC system is operated to provide cabin heating to reach a cabin temperature setpoint (dashed plot 809). The engine coolant temperature (plot 806) increases as the vehicle is operated, increasing the temperature of the heated air provided to the cabin and, thus, the cabin temperature (plot 810).

Shortly before time t1, the driver tips out. At time t1, the accelerator pedal position (plot 802) decreases below the accelerator pedal position threshold (dashed line 818). Therefore, it may be assumed at time t1 that no driving-based start/stop inhibits are present. Additionally at time t1, the engine coolant temperature (plot 806) is above the engine coolant temperature threshold (dashed line 820), the cabin temperature (plot 810) is between the lower cabin temperature threshold (dashed line 824) and the upper cabin temperature threshold (dashed line 826), and the ambient temperature (plot 814) is between the lower ambient temperature threshold (dashed line 828) and the upper ambient temperature threshold (dashed line 830). Therefore, it may also be assumed that no climate-based start/stop inhibits are present. As a result, idle-stop conditions are met at time t1, and the engine is shut down for an idle-stop (plot 804).

While the engine is off following the idle-stop at time t1, the engine coolant temperature decreases (plot 806) as the engine cools down. As a result, the cabin temperature also decreases (plot 810). Still, the engine coolant temperature (plot 806) remains above the engine coolant temperature threshold (dashed line 820). The cabin temperature (plot 810) also remains above the lower cabin temperature threshold (dashed line 824). For example, due to the first driver's passive climate control tendencies, the lower cabin temperature threshold and the upper cabin temperature threshold define a relatively wide range of acceptable cabin temperatures around the cabin temperature setpoint (dashed plot 809).

However, at time t2, the driver increases the cabin temperature setpoint (dashed plot 809). A controller (e.g., controller 12 of FIG. 2) uses this climate control input to update the engine coolant temperature threshold (dashed line 820) and the cabin temperature thresholds (dashed lines 824 and 826). For example, the engine coolant temperature threshold (dashed line 820) is increased due to the higher heating demand. The cabin temperature thresholds are re-centered around the new cabin temperature setpoint, and the difference between the lower cabin temperature threshold (dashed line 824) and the upper cabin temperature threshold (dashed line 826) is decreased such that the range of acceptable cabin temperatures is decreased. As such, the cabin temperature will be more tightly control than prior to time t2.

Due to the adjusted thresholds, the engine coolant temperature (plot 806) is no longer greater than the engine coolant temperature threshold (dashed line 820), and the cabin temperature (plot 810) is no longer greater than the lower cabin temperature threshold (dashed line 824). Thus, climate-based start/stop inhibits are present, and the engine is restarted (plot 804) to provide heating even though the accelerator pedal position (plot 802) remains below the accelerator pedal position threshold (dashed line 818). A resulting idle-stop duration d1 is shorter than if climate-based inhibits where not used (e.g., a duration d2), but climate control performance is increased. With the engine restarted, the cabin temperature (plot 810) increases and quickly reaches the cabin temperature setpoint (plot 811).

At a later time t3 (e.g., after a period of time passes), the engine is operated to provide driver-demanded torque. The ambient temperature (plot 814) is relatively high, and so the HVAC is operated in an air conditioning mode (plot 812) to maintain the cabin temperature (plot 810) at a cooler cabin temperature setpoint (dashed plot 809). As described above with respect to FIGS. 1 and 2, an AC compressor may be powered by a front end accessory drive (FEAD) of the engine, and thus, the AC compressor may only be operated while the engine is on.

At time t4, the accelerator pedal position (plot 802) decreases below the accelerator pedal position threshold (dashed line 818), and it may be assumed that no other driving-based start/stop inhibits are present. The evaporator temperature (plot 808) is below the evaporator temperature threshold (dashed line 822), the cabin temperature (plot 810) is between the lower cabin temperature threshold (dashed line 824) and the upper cabin temperature threshold (dashed line 826), and the ambient temperature (plot 814) is between the lower ambient temperature threshold (dashed line 828) and the upper ambient temperature threshold (dashed line 830). As such, idle-stop conditions are met at time t4, and the engine is shut down for an idle-stop (plot 804).

While the engine, and thus the AC compressor, is off during the idle-stop, the evaporator temperature increases (plot 808). As a result, the air provided to the cabin also increases, and thus, the cabin temperature increases (plot 810). However, the evaporator temperature (plot 808) remains below the evaporator temperature threshold (dashed line 822), and the cabin temperature (plot 810) remains above the upper cabin temperature threshold (dashed line 826). As a result, the engine is not restarted due to a climate-based start/stop inhibit. Instead, the engine is restarted at time t5 in response to the driver tipping in and the accelerator pedal position (plot 802) surpassing the accelerator pedal position threshold (dashed line 818). While not shown, a blower setting may be adjusted to provide a faster blower ramp-down at the idle-stop. In this way, the idle-stop duration is longer than if the driver had more aggressive climate control tendencies.

Continuing to FIG. 9, an example timeline 900 is shown for a second driver, different than the first driver, who has generally aggressive driving habits and generally aggressive climate control preferences. The plots shown in timeline 900 are the same as those in timeline 800 of FIG. 8, although the shapes of the plots may be different, and are numbered similarly (e.g., plot 902 of FIG. 9 corresponds to plot 802 of FIG. 8). Thus, the plots of FIG. 9 will not be reintroduced.

Between time t0 and time t1, the engine is on and operating (plot 904) to provide driver-demanded torque, determined based on the accelerator pedal position (plot 902). For example, a current drive cycle may have begun shortly before time t0. The ambient temperature (plot 914) is low, and due to the cold ambient temperature, the driver has requested cabin heating (plot 912). Thus, the HVAC system is operated to provide cabin heating to reach a cabin temperature setpoint (dashed plot 909), which may be higher than the cabin temperature setpoint of the first driver (shown in dashed plot 809 of FIG. 8) for the same ambient temperature condition. The engine coolant temperature (plot 906) increases as the vehicle is operated, increasing the temperature of the heated air provided to the cabin and, thus, the cabin temperature (plot 910). Further, due to the aggressive driving style of the second driver, the engine coolant temperature may increase more quickly than for the first driver (shown in plot 806 of FIG. 8).

Shortly before time t1, the driver tips out. At time t1, the accelerator pedal position (plot 902) decreases below the accelerator pedal position threshold (dashed line 918), which is lower than the accelerator pedal position threshold for the first driver (shown by dashed line 818 of FIG. 8). Therefore, it may be assumed at time t1 that no driving-based start/stop inhibits are present. Additionally at time t1, the engine coolant temperature (plot 906) is above the engine coolant temperature threshold (dashed line 920), the cabin temperature (plot 910) is between the lower cabin temperature threshold (dashed line 924) and the upper cabin temperature threshold (dashed line 926), and the ambient temperature (plot 914) is between the lower ambient temperature threshold (dashed line 928) and the upper ambient temperature threshold (dashed line 930). Therefore, it may also be assumed that no climate-based start/stop inhibits are present. As a result, idle-stop conditions are met at time t1, and the engine is shut down for an idle-stop (plot 904).

While the engine is off following the idle-stop at time t1, the engine coolant temperature decreases (plot 906) as the engine cools down. However, the engine coolant temperature remains above the engine coolant temperature threshold (dashed line 920), which may be set relatively low due to the second driver's aggressive driving style. Due to the second driver's aggressive climate control tendencies, the lower cabin temperature threshold and the upper cabin temperature threshold define a relatively narrow range of acceptable cabin temperatures around the cabin temperature setpoint (dashed plot 909). At time t2, the cabin temperature (plot 910) reaches the lower cabin temperature threshold (dashed line 924). In response, the engine is restarted (plot 904) in order to prevent climate control degradation, even though the driver does not demand torque. A resulting idle-stop duration d3 is shorter compared to if climate-based inhibits were not used (e.g., a duration d4) and shorter than the idle-stop duration d1 for the first driver who has more passive climate control preferences (shown in FIG. 8), but climate control performance is increased. With the engine restarted, the cabin temperature (plot 910) increases and quickly reaches the cabin temperature setpoint (plot 911).

At a later time t3 (e.g., after a period of time passes), the engine is operated to provide driver-demanded torque. The ambient temperature (plot 914) is relatively high, and so the HVAC is operated in an air conditioning mode (plot 912) to maintain the cabin temperature (plot 910) at a cooler cabin temperature setpoint (dashed plot 909), which may be lower than the cabin temperature setpoint of the first driver (shown in dashed plot 809 of FIG. 8) for the same ambient temperature condition.

At time t4, the accelerator pedal position (plot 902) decreases below the accelerator pedal position threshold (dashed line 918), and it may be assumed that no other driving-based start/stop inhibits are present. The evaporator temperature (plot 908) is below the evaporator temperature threshold (dashed line 922), the cabin temperature (plot 910) is between the lower cabin temperature threshold (dashed line 924) and the upper cabin temperature threshold (dashed line 926), and the ambient temperature (plot 914) is between the lower ambient temperature threshold (dashed line 928) and the upper ambient temperature threshold (dashed line 930). As such, idle-stop conditions are met at time t4, and the engine is shut down for an idle-stop (plot 904).

While the engine, and thus the AC compressor, is off during the idle-stop, the evaporator temperature increases (plot 908). As a result, the air provided to the cabin also increases, and thus, the cabin temperature increases (plot 910). The evaporator temperature (plot 908) reaches the evaporator temperature threshold (dashed line 922) at time t5, which may be lower than the evaporator temperature threshold for the first driver (dashed line 822 shown in FIG. 8). As a result, the engine is restarted due to the climate-based start/stop inhibit. While not shown, a blower setting may be adjusted to provide a slower blower ramp-down at the idle-stop. In this way, a resulting idle-stop duration d5 is shorter than if the driver had less aggressive climate control tendencies (such as the first driver of FIG. 8) and is shorter than if climate-based start/stop inhibits were not used. However, climate control performance is not degraded, with the cabin temperature (plot 910) remaining between the upper and lower cabin temperature thresholds (dashed lines 926 and 924, respectively), increasing driver comfort and satisfaction.

In this way, climate control performance may be balanced more effectively with fuel economy in an engine with start/stop capabilities while increasing customer satisfaction by customizing start/stop control for each individual driver. As a result, an optimum balance between climate control performance and fuel economy can be achieved for each driver. Furthermore, synergistic interactions between driving style and climate control preferences may be leveraged.

The technical effect of adjusting a start/stop parameter threshold based on at least one of drive inputs, a driver-specific drive history, climate control inputs, and a driver-specific climate control history is that climate control performance and fuel economy may be balanced differently for each driver.

One example method comprises adaptively adjusting a threshold for a parameter associated with idle-stop operation of an engine as a function of at least one of an operator drive history and operator cabin climate control preferences, the operator drive history and operator cabin climate control preferences learned over a plurality of drive cycles including a current drive cycle; and inhibiting the idle-stop operation responsive to a value of the parameter relative to the adjusted threshold. In the preceding example, additionally or optionally, the parameter includes an engine coolant temperature, and inhibiting the idle-stop operation responsive to the value of the parameter relative to the adjusted threshold includes inhibiting the idle-stop operation responsive to the engine coolant temperature being less than the threshold. In any or all of the preceding examples, additionally or optionally, adaptively adjusting the threshold includes making a first adjustment to the threshold based on the operator drive history and making a second adjustment to the threshold based on the operator cabin climate control preferences. In any or all of the preceding examples, additionally or optionally, making the first adjustment to the threshold includes decreasing the threshold responsive to the operator drive history indicating aggressive driving habits and increasing the threshold responsive to the operator drive history indicating passive driving habits, a degree of the decreasing or increasing based on a degree of aggressiveness or passiveness, respectively. In any or all of the preceding examples, additionally or optionally, making the second adjustment to the threshold includes increasing the threshold responsive to the operator cabin climate control preferences indicating aggressive climate control habits and decreasing the threshold responsive to the operator cabin climate control preferences indicating passive climate control habits, a degree of the increasing or decreasing based on a degree of aggressiveness of passiveness, respectively. In any or all of the preceding examples, additionally or optionally, the parameter includes an evaporator temperature, and inhibiting the idle-stop operation responsive to the value of the parameter relative to the adjusted threshold includes inhibiting the idle-stop operation responsive to the evaporator temperature surpassing the threshold. In any or all of the preceding examples, additionally or optionally, adaptively adjusting the threshold includes decreasing the threshold responsive to the operator cabin climate control preferences indicating aggressive climate control habits and increasing the threshold responsive to the operator cabin climate control preferences indicating passive climate control habits, a degree of the decreasing or increasing based on a degree of aggressiveness of passiveness, respectively. In any or all of the preceding examples, additionally or optionally, the operator cabin climate control preferences are learned as a function of ambient temperature. In any or all of the preceding examples, additionally or optionally, the engine includes an air conditioning system driven by a front end accessory drive coupled to the engine.

Another example method comprises: operating in one of a first mode that reduces inhibits of engine start/stop operation and a second mode that increases inhibits of the engine start/stop operation; and selecting between the first and the second mode based on operator drive history and operator cabin climate control preferences learned over a plurality of drive cycles including a current drive cycle. In any or all of the preceding examples, additionally or optionally, the method further comprises: adjusting thresholds for a first set of start/stop parameters as a function of operator drive history only; adjusting thresholds for a second set of start/stop parameters, different than the first set, as a function of operator climate control preferences only; and adjusting thresholds for a third set of start/stop parameters, different than each of the first set and the second set, as a function of each of the operator drive history and the operator climate control preferences. In any or all of the preceding examples, additionally or optionally, the first set of start/stop parameters includes accelerator pedal position, the adjusting thresholds for the first set of start/stop parameters includes increasing the accelerator pedal position threshold while operating in the first mode and decreasing the accelerator pedal position threshold while operating in the second mode, and the method further comprises inhibiting the engine start/stop operation responsive to the accelerator pedal position being greater than the accelerator pedal position threshold while operating in both the first mode and the second mode. In any or all of the preceding examples, additionally or optionally, the second set of start/stop parameters includes evaporator temperature, the adjusting thresholds for the second set of start/stop parameters includes increasing an evaporator temperature threshold while operating in the first mode and decreasing the evaporator temperature threshold while operating in the second mode, and the method further comprises inhibiting the engine start/stop operation responsive to the evaporator temperature being greater than the evaporator temperature threshold while operating in both the first mode and the second mode. In any or all of the preceding examples, additionally or optionally, the third set of stop/start parameters includes engine coolant temperature, the adjusting thresholds for the third set of start/stop parameters includes decreasing a engine coolant temperature threshold while operating in the first mode and increasing the engine coolant temperature threshold while operating in the second mode, and the method further comprises inhibiting the engine start/stop operation responsive to the engine coolant temperature being less than the engine coolant temperature threshold while operating in both the first mode and the second mode. In any or all of the preceding examples, additionally or optionally, the selecting between the first and the second mode based on the operator drive history and the operator cabin climate control preferences learned over the plurality of drive cycles including the current drive cycle include based on cabin temperature and blower settings.

Another example vehicle system, comprises: an engine; a heating, ventilation, and air conditioning (HVAC) system; and a controller storing executable instructions on non-transitory memory that, when executed, cause the controller to: adjust idle-stop conditions based on cabin climate control preferences of a current driver, the cabin climate control preferences learned over a plurality of drive cycles including the current drive cycle; enable idle-stop responsive to idle-stop conditions being met; and inhibit idle-stop responsive to idle-stop conditions not being met. In any or all of the preceding examples, additionally or optionally, the idle-stop conditions include an evaporator temperature being less than an evaporator temperature threshold, an ambient temperature being greater than a lower ambient temperature and less than an upper ambient temperature threshold, a cabin temperature being greater than a lower cabin temperature threshold and an upper cabin temperature threshold, and an engine coolant temperature being greater than an engine coolant temperature threshold. In any or all of the preceding examples, additionally or optionally, the HVAC system includes an air conditioning compressor driven by a front-end accessory drive of the engine, and to adjust the idle-stop conditions based on the cabin climate control preferences of the current driver, the controller includes further instructions stored in non-transitory memory that, when executed, cause the controller to decrease the evaporator temperature threshold responsive to the cabin climate control preferences of the current driver indicating aggressive climate control; and increase the evaporator temperature threshold responsive to the cabin climate control preferences of the current driver indicating passive climate control. In any or all of the preceding examples, additionally or optionally, to adjust the idle-stop conditions based on the cabin climate control preferences of the current driver, the controller includes further instructions stored in non-transitory memory that, when executed, cause the controller to: increase the engine coolant temperature threshold responsive to the cabin climate control preferences of the current driver indicating aggressive climate control; and decrease the engine coolant temperature threshold responsive to the cabin climate control preferences of the current driver indicating passive climate control. In any or all of the preceding examples, additionally or optionally, the controller includes further instructions stored in non-transitory memory that, when executed, cause the controller to: further adjust the engine coolant temperature threshold based on an aggressiveness of a driving style of the current driver, the aggressiveness learned over the plurality of drive cycles including the current drive cycle, including decreasing the engine coolant temperature as the aggressiveness increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adaptively adjusting a threshold for a parameter associated with idle-stop operation of an engine as a function of at least one of an operator drive history and operator cabin climate control preferences, the operator drive history and operator cabin climate control preferences learned over a plurality of drive cycles including a current drive cycle, wherein the operator cabin climate control preferences are learned as a function of ambient temperature; and
inhibiting the idle-stop operation responsive to a value of the parameter relative to the adjusted threshold.

2. The method of claim 1, wherein the parameter includes an engine coolant temperature, and inhibiting the idle-stop operation responsive to the value of the parameter relative to the adjusted threshold includes inhibiting the idle-stop operation responsive to the engine coolant temperature being less than the threshold.

3. The method of claim 2, wherein adaptively adjusting the threshold includes making a first adjustment to the threshold based on the operator drive history and making a second adjustment to the threshold based on the operator cabin climate control preferences.

4. The method of claim 3, wherein making the first adjustment to the threshold includes decreasing the threshold responsive to the operator drive history indicating aggressive driving habits and increasing the threshold responsive to the operator drive history indicating passive driving habits, a degree of the decreasing or increasing based on a degree of aggressiveness or passiveness, respectively.

5. The method of claim 3, wherein making the second adjustment to the threshold includes increasing the threshold responsive to the operator cabin climate control preferences indicating aggressive climate control habits and decreasing the threshold responsive to the operator cabin climate control preferences indicating passive climate control habits, a degree of the increasing or decreasing based on a degree of aggressiveness of passiveness, respectively.

6. The method of claim 1, wherein the parameter includes an evaporator temperature, and inhibiting the idle-stop operation responsive to the value of the parameter relative to the adjusted threshold includes inhibiting the idle-stop operation responsive to the evaporator temperature surpassing the threshold.

7. The method of claim 6, wherein adaptively adjusting the threshold includes decreasing the threshold responsive to the operator cabin climate control preferences indicating aggressive climate control habits and increasing the threshold responsive to the operator cabin climate control preferences indicating passive climate control habits, a degree of the decreasing or increasing based on a degree of aggressiveness of passiveness, respectively.

8. The method of claim 1, wherein the engine includes an air conditioning system driven by a front end accessory drive coupled to the engine.

9. A method, comprising:
operating in one of a first mode that reduces inhibits of engine start/stop operation and a second mode that increases inhibits of the engine start/stop operation; and
selecting between the first and the second mode based on operator drive history and operator cabin climate control preferences learned over a plurality of drive cycles including a current drive cycle.

10. The method of claim 9, further comprising:
adjusting thresholds for a first set of start/stop parameters as a function of operator drive history only;
adjusting thresholds for a second set of start/stop parameters, different than the first set, as a function of operator climate control preferences only; and
adjusting thresholds for a third set of start/stop parameters, different than each of the first set and the second set, as a function of each of the operator drive history and the operator climate control preferences.

11. The method of claim 10, wherein the first set of start/stop parameters includes accelerator pedal position, the adjusting thresholds for the first set of start/stop parameters includes increasing the accelerator pedal position threshold while operating in the first mode and decreasing the accelerator pedal position threshold while operating in the second mode, and the method further comprises inhibiting the engine start/stop operation responsive to the accelerator pedal position being greater than the accelerator pedal position threshold while operating in both the first mode and the second mode.

12. The method of claim 10, wherein the second set of start/stop parameters includes evaporator temperature, the adjusting thresholds for the second set of start/stop parameters includes increasing an evaporator temperature threshold while operating in the first mode and decreasing the evaporator temperature threshold while operating in the second mode, and the method further comprises inhibiting the engine start/stop operation responsive to the evaporator temperature being greater than the evaporator temperature threshold while operating in both the first mode and the second mode.

13. The method of claim 10, wherein the third set of stop/start parameters includes engine coolant temperature, the adjusting thresholds for the third set of start/stop parameters includes decreasing a engine coolant temperature threshold while operating in the first mode and increasing the engine coolant temperature threshold while operating in the second mode, and the method further comprises inhibiting the engine start/stop operation responsive to the engine coolant temperature being less than the engine coolant temperature threshold while operating in both the first mode and the second mode.

14. The method of claim 9, wherein the selecting between the first and the second mode based on the operator drive history and the operator cabin climate control preferences learned over the plurality of drive cycles including the current drive cycle include selecting based on cabin temperature and blower settings.

15. A vehicle system, comprising:
an engine;
a heating, ventilation, and air conditioning (HVAC) system; and
a controller storing executable instructions on non-transitory memory that, when executed, cause the controller to:
adjust idle-stop conditions based on cabin climate control preferences of a current driver, the cabin climate control preferences learned over a plurality of drive cycles including the current drive cycle;
enable idle-stop responsive to idle-stop conditions being met; and
inhibit idle-stop responsive to idle-stop conditions not being met.

16. The system of claim 15, wherein the idle-stop conditions include an evaporator temperature being less than an evaporator temperature threshold, an ambient temperature being greater than a lower ambient temperature and less than an upper ambient temperature threshold, a cabin temperature being greater than a lower cabin temperature threshold and an upper cabin temperature threshold, and an engine coolant temperature being greater than an engine coolant temperature threshold.

17. The system of claim 16, wherein the HVAC system includes an air conditioning compressor driven by a front-end accessory drive of the engine, and to adjust the idle-stop conditions based on the cabin climate control preferences of the current driver, the controller includes further instructions stored in non-transitory memory that, when executed, cause the controller to:
decrease the evaporator temperature threshold responsive to the cabin climate control preferences of the current driver indicating aggressive climate control; and
increase the evaporator temperature threshold responsive to the cabin climate control preferences of the current driver indicating passive climate control.

18. The system of claim 16, wherein to adjust the idle-stop conditions based on the cabin climate control preferences of the current driver, the controller includes further instructions stored in non-transitory memory that, when executed, cause the controller to:
increase the engine coolant temperature threshold responsive to the cabin climate control preferences of the current driver indicating aggressive climate control; and
decrease the engine coolant temperature threshold responsive to the cabin climate control preferences of the current driver indicating passive climate control.

19. The system of claim 18, wherein the controller includes further instructions stored in non-transitory memory that, when executed, cause the controller to:
further adjust the engine coolant temperature threshold based on an aggressiveness of a driving style of the current driver, the aggressiveness learned over the plurality of drive cycles including the current drive cycle, including decreasing the engine coolant temperature as the aggressiveness increases.

* * * * *